Oct. 22, 1940.                W. A. PURTELL                2,219,197
                                 DRIVE PIN
                             Filed Jan. 8, 1938
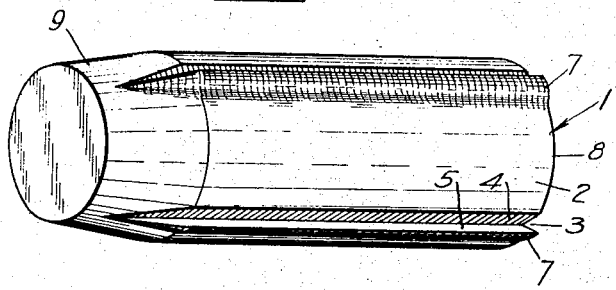
Fig. 1.
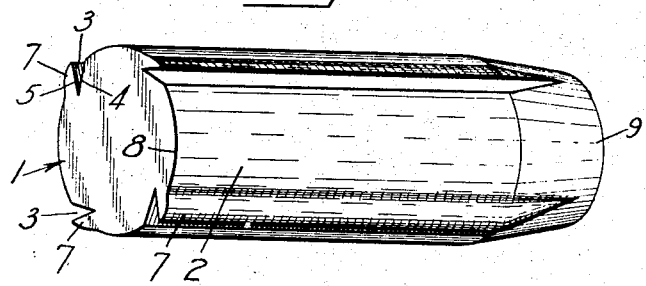
Fig. 2.
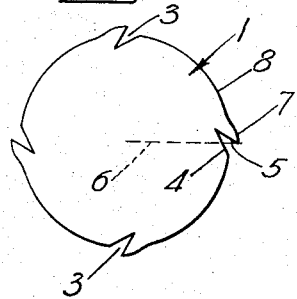
Fig. 3.
INVENTOR
William A. Purtell
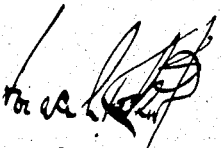
By
ATTORNEY Patented Oct. 22, 1940

2,219,197

UNITED STATES PATENT OFFICE 2,219,197

DRIVE PIN

William A. Purtell, West Hartford, Conn., assignor to The Holo-Krome Screw Corporation, a corporation of Connecticut Application January 8, 1938, Serial No. 184,015

8 Claims. (Cl. 85—19)

My invention relates to drive pins.

It has among its objects to provide an improved drive pin, and more particularly to provide such a pin having improved locking means on the surface thereof. A further object of my invention is to provide such an improved pin of the type including radially located longitudinally extending grooves and cooperating locking means extending along the edges of the grooves, both the grooves and the cooperating means herein being of an improved construction and cooperating to produce improved results. These and other objects of my improvement will, however, hereinafter more fully appear.

In the accompanying drawing, I have shown for purposes of illustration one embodiment which my invention may assume in practice.

In the drawing:

Figure 1 is a perspective view of a pin, the same being viewed from the driving end thereof;

Fig. 2 is a perspective view of the pin viewed from the opposite end thereof, and Fig. 3 is an end elevation of the pin viewed from the driven end thereof.

In this illustrative construction, I have shown a drive pin, generally indicated at 1, having a generally cylindrical body 2 and provided with improved longitudinally extending locking means thereon as hereinafter described.

As shown, a plurality of angularly disposed longitudinally extending grooves 3 is provided around the periphery of the pin, these grooves being four in number in this illustrative pin and identical in size and shape and equally spaced around the pin periphery and from the axis of the pin. As shown, each of these grooves 3 is generally V-shaped and, as distinguished from having the walls thereof diverging at equal angles from a radius line of the pin, both of these walls, herein indicated at 4 and 5, are disposed angularly and transversely relative to such a radius line, indicated for purposes of illustration at 6 in Figure 3. Moreover, it will be noted that the wall 4 of each groove 3 is inside the wall 5 and formed on the body of the pin, while the wall 5 forms the outer wall of the groove and the inner face of an externally curved resilient extension 7 having an edge portion of minimum diameter overlying the groove and a portion in back of this edge and of gradually increasing cross section, merging into the adjacent undisturbed peripheral portion 8 of the pin. Thus, it will be noted that a plurality of longitudinally extending spaced grooves 3 is provided about the periphery of the pin between these undisturbed peripheral portions 8, and that a resilient generally laterally disposed projection 7 is provided at one side only of each of these grooves 3 and extending lengthwise thereof and laterally over the same between the latter and one of the undisturbed peripheral portions 8. Here also it will be noted that, while the grooves 3 and resilient portions 7 may be extended throughout the entire length of the pin, the latter, as shown, is provided with a tapered extremity 9 into which both the grooves 3 and portions 7 are merged intermediate the ends of the taper.

As a result of this construction, it is made possible to obtain effective holding of the pin by the portions 7, due to the normal outward pressure of these portions and the fact that, as they enter a slightly smaller hole, they press against and grip the wall thereof. Here it will also be noted that, while effectively gripping the wall, the resiliency of these portions 7 is also markedly greater than mere raised projections of more rigid form on opposite sides of a slot and in which the metal on both sides of the edge of the slot has to deform the groove in order to yield. My improved overhanging locking resilient portions 7 obviously also may have their resiliency increased or decreased as desired by varying the angle at which the groove 3 underlying the same is inserted in the pin and consequently varying the angle and thickness of metal in the portion 7. Attention also is directed to the fact that this construction, due to the possible yielding of the resilient locking member, is such as to make it possible to minimize objectional digging-in of the same into the wall of the hole, while still securely positioning the pin in the hole. It will, of course, also be understood, that I contemplate the use of my construction in pins formed of various metals wherein the portions 7 are of different resiliency and that the pin may be of harder or softer metal than the wall of the hole, as desired. It will, of course, also be apparent that my improved pin may be very inexpensively produced. This and other advantages of my improved construction will, however, be clearly apparent to those skilled in the art.

While I have in this application specifically described one embodiment which my invention may assume in practice, it will be understood that this is shown for purposes of illustration and that the same may be modified and embodied in other forms without departing from its spirit or the scope of the appended claims.

What I claim as new and desire to secure by Letters Patent is:

1. A drive pin having in its periphery a longitudinal groove and a resilient portion of the periphery of said pin projecting substantially above the normal periphery to form a locking projection completely overlying and capable of filling said groove with its outer surface in said normal periphery when driven in place.

2. A drive pin having a longitudinal groove and a resilient locking projection extending substantially above the normal periphery of said pin and overhanging said groove, the back of said projection sloping downwardly toward and merging into the periphery of said pin along the length of said groove.

3. A drive pin having a longitudinal groove and a resilient locking projection extending substantially above the normal periphery of said pin and overhanging said groove and having a portion of increasing cross section forming one wall of said groove and having its own opposite wall sloping downwardly toward and merging into the periphery of said pin.

4. A drive pin having in its periphery a longitudinal groove and a resilient locking projection extending substantially above said periphery and overhanging said groove, said projection having one side thereof forming one edge of said groove and overhanging said groove and having its other side supported along its length by a portion of the normal periphery of said pin, and said groove comprising the space vacated by said projection and said projection comprising a peripheral portion of said pin bodily displaced from the normal periphery of the latter.

5. A locking pin having a series of angularly related spaced grooves in its periphery and raised resilient locking portions alternately arranged relative to said grooves and projecting substantially above the circumference of said body and extending along corresponding sides of each groove and overhanging the same, said grooves comprising the spaces vacated by said portions and said portions comprising peripheral portions of said body bodily displaced from the normal periphery of the latter.

6. A locking pin having a body of circular cross section and a series of angularly related spaced grooves in its periphery and raised resilient locking portions extending along one edge of each groove and overhanging the same, said locking portions comprising displaced peripheral portions projecting substantially above the normal circular periphery of said body and having their sides remote from the grooves adjacent thereto sloping toward and merging with the circular outline of said body, and said grooves comprising the spaces vacated by said portions.

7. A driving pin having a body of circular cross section and having in its periphery a series of longitudinal recesses and longitudinally extending resilient means projecting substantially above said periphery and extending transversely over said recesses, said resilient means having external faces sloping toward and merging transversely into the periphery of said pin, said faces comprising displaced portions of the normal circular periphery of said body and adapted to grip the wall of a hole into which said pin is driven as said resilient means are compressed toward said recesses by contact with the wall surface.

8. A driving pin having a body of circular cross section and a series of longtudinal recesses therein and longitudinally extending resilient means projecting substantially above the periphery of said body and extending transversely over said recesses and having external faces sloping toward and merging with the periphery of said pin and adapted to grip the wall of a hole into which said pin is driven as said resilient means are compressed toward said recesses by contact with the wall surface, said pin having said recesses and resilient means extending to one end thereof and a tapered end surface at its opposite end between the ends of which tapered surface the ends of said recesses and resilient means terminate.

WILLIAM A. PURTELL.